United States Patent [19]

Faig

[11] Patent Number: 4,815,350

[45] Date of Patent: Mar. 28, 1989

[54] CIRCULAR SAW MACHINE

[75] Inventor: Paul Faig, Unterensingen, Fed. Rep. of Germany

[73] Assignee: Chr. Eisele Maschinenfabrik GmbH & Co. KG, Köngen, Fed. Rep. of Germany

[21] Appl. No.: 112,384

[22] Filed: Oct. 22, 1987

[30] Foreign Application Priority Data

Oct. 23, 1986 [DE] Fed. Rep. of Germany ....... 3636050

[51] Int. Cl.⁴ ............................. B26D 7/02; B27B 5/29
[52] U.S. Cl. ........................................ 83/463; 83/464; 83/465; 83/471.3; 269/99; 269/234
[58] Field of Search ................ 83/452, 463, 464, 465, 83/466, 471.3, 486.1; 269/99, 100, 73, 76, 81, 217, 234

[56] References Cited

U.S. PATENT DOCUMENTS 3,971,186 7/1976 Havelka et al. ................. 83/452 X
4,576,075 3/1986 Holder ................................ 83/464

Primary Examiner—Frank T. Yost
Assistant Examiner—Hien H. Phan
Attorney, Agent, or Firm—Lorusso & Loud

[57] ABSTRACT

A circular saw machine has a workpiece support and a clamping means consisting of a clamping arm and a clamping block for clamping workpieces; the clamping means is displaceable and clampable in a shaped groove with the aid of sliding members. The sliding members have first inclined faces and slide on corresponding second inclinded faces of the clamping block. Their slide movement may be initiated by means of a screw spindle connecting the two sliding members. When the sliding members slide upwards the clamping means is firmly clamped in the shaped groove. When they slide in the opposite direction clamping is released.

5 Claims, 4 Drawing Sheets

CIRCULAR SAW MACHINE

The invention relates to a circular saw machine comprising a machine frame, a workpiece support, a rotatingly driven circular saw blade and a clamping means consisting of clamping arm and clamping block for clamping workpieces on the workpiece support, the clamping block being displaceable and clampable on the machine frame and relative to the circular saw blade in a shaped groove and by means of at least one sliding member engaging in the groove.

In a known circular saw machine of this type (U.S. Pat. No. 4,576,075), only one single sliding member engages in the shaped groove and this sliding member is clampable via an eccentric. This means that the clamping device can often not be clamped with the necessary precision and force.

The object of the invention is to modify the clamping means for a circular saw machine of the generic type such that the clamping effect achieved is more powerful and more accurate.

This object is accomplished in accordance with the invention in that two sliding members are arranged in the shaped groove in spaced relation to one another, that these sliding members have first inclined faces extending transversely to the shaped groove and facing one another, that second inclined faces are formed on the clamping block parallel to the first faces, one sliding member abutting with its first inclined face on each of the second inclined faces, and that a screw spindle freely penetrating through the clamping block is supported on one of the sliding members with one of its ends so as to be rotatable and axially non-displaceable while its other end engages in an internal thread of the other sliding member such that when the screw spindle rotates the distance between the sliding members is altered and the sliding members slide with their first inclined faces up the second inclined faces of the clamping block so as to be clamped in position in the shaped groove.

The following description of a preferred embodiment of the invention serves to explain the invention in greater detail in conjunction with the attached drawings, in which FIG. 1 is a perspective view of a circular saw machine with a clamping means;

Figure 1:
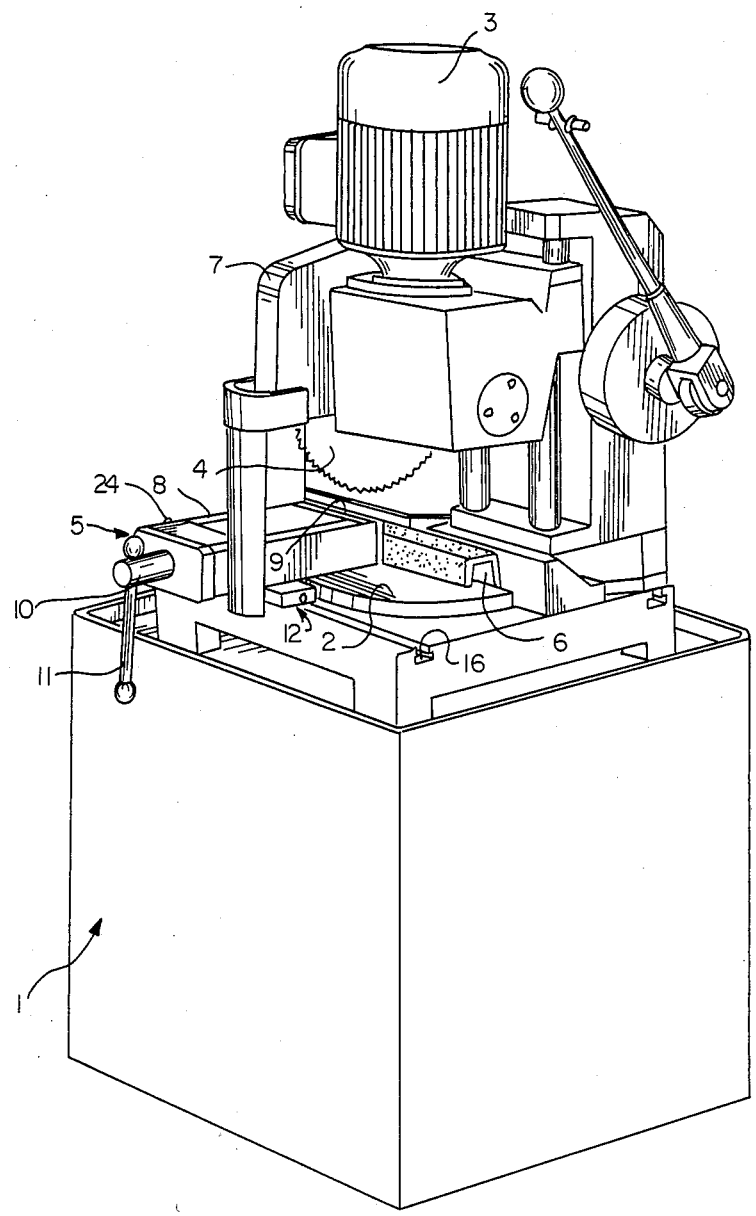

The circular saw machine illustrated in FIG. 1 has a machine frame 1, a workpiece support 2, a circular saw blade 4 rotatingly driven by a motor 3 and a clamping means 5 for clamping a workpiece 6, for example a U-shaped bar, on the workpiece support 2. The circular saw blade 4 is covered in the customary manner by a protective casing 7 and can be moved up and down with the motor 3 in a guide means so that the rotating saw blade 4 makes the desired cut in the workpiece 6.

In the arrangement illustrated in FIG. 1, the workpiece 6 is sawn at right angles to its longitudinal axis. However, in machines of this type, the saw blade 4 can be adjusted with its mounting and drive motor 3 such that miter cuts can be made in the workpiece 6 at an angle differing from 90° or slots sawn into the workpiece parallel to its longitudinal axis. For this purpose, the saw blade assembly may be rotated about an axis extending perpendicularly to the workpiece support 2 in a manner which is known per se and not therefore expressly illustrated and described.

The clamping means 5 (cf. in particular FIGS. 2 and 3) comprises, in the customary manner, a hollow clamping arm 8 with a fence plate 9 engaging on the workpiece 6. A screw spindle 10 is mounted in the interior of the clamping arm 8 so as to be rotatable but not axially displaceable. The screw spindle 10 protrudes with one end (located to the left in FIG. 1) beyond the clamping arm 8 and this end supports the customary, axially displaceable actuating arm 11.

Figure 2:
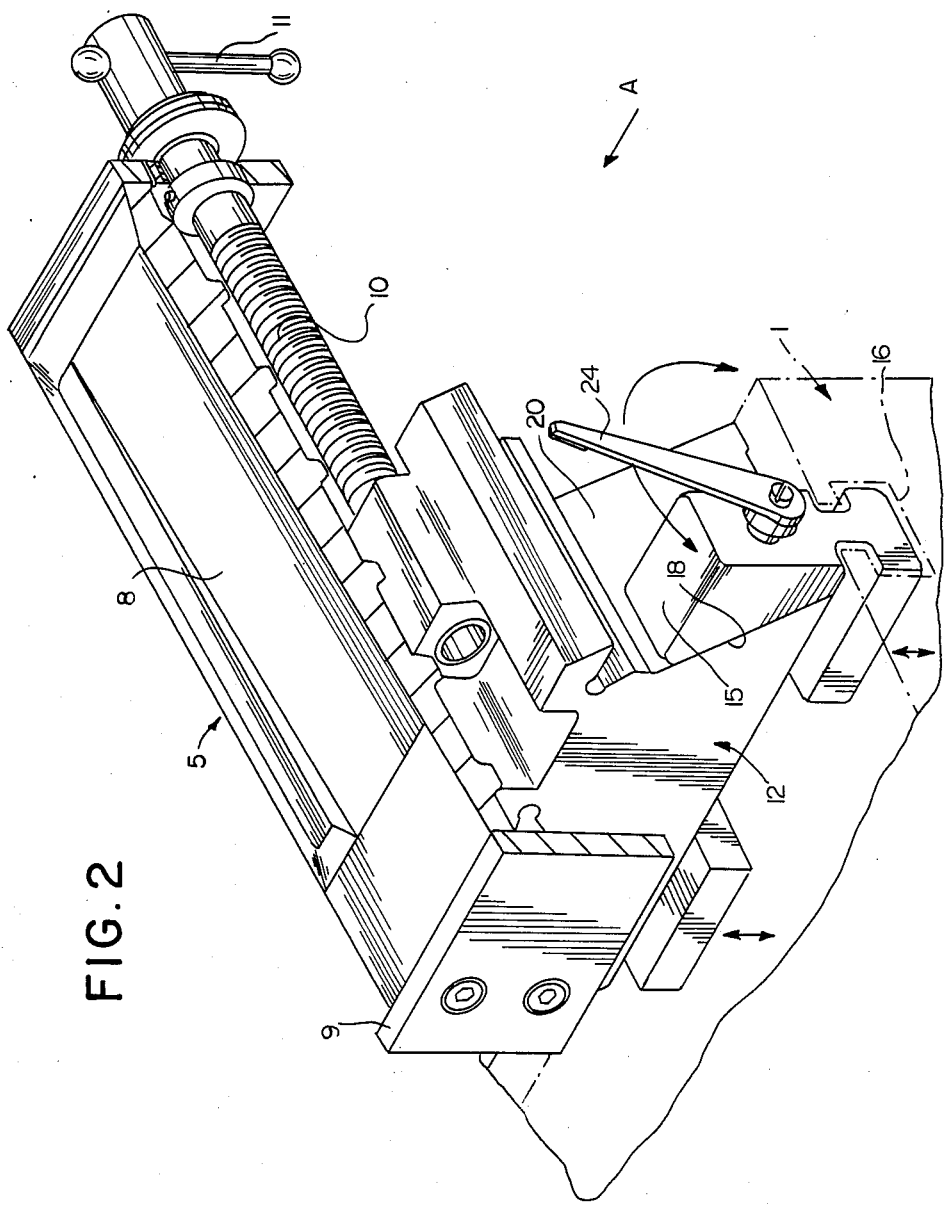
FIG. 2 is a perspective view of the clamping means.
Figure 3:
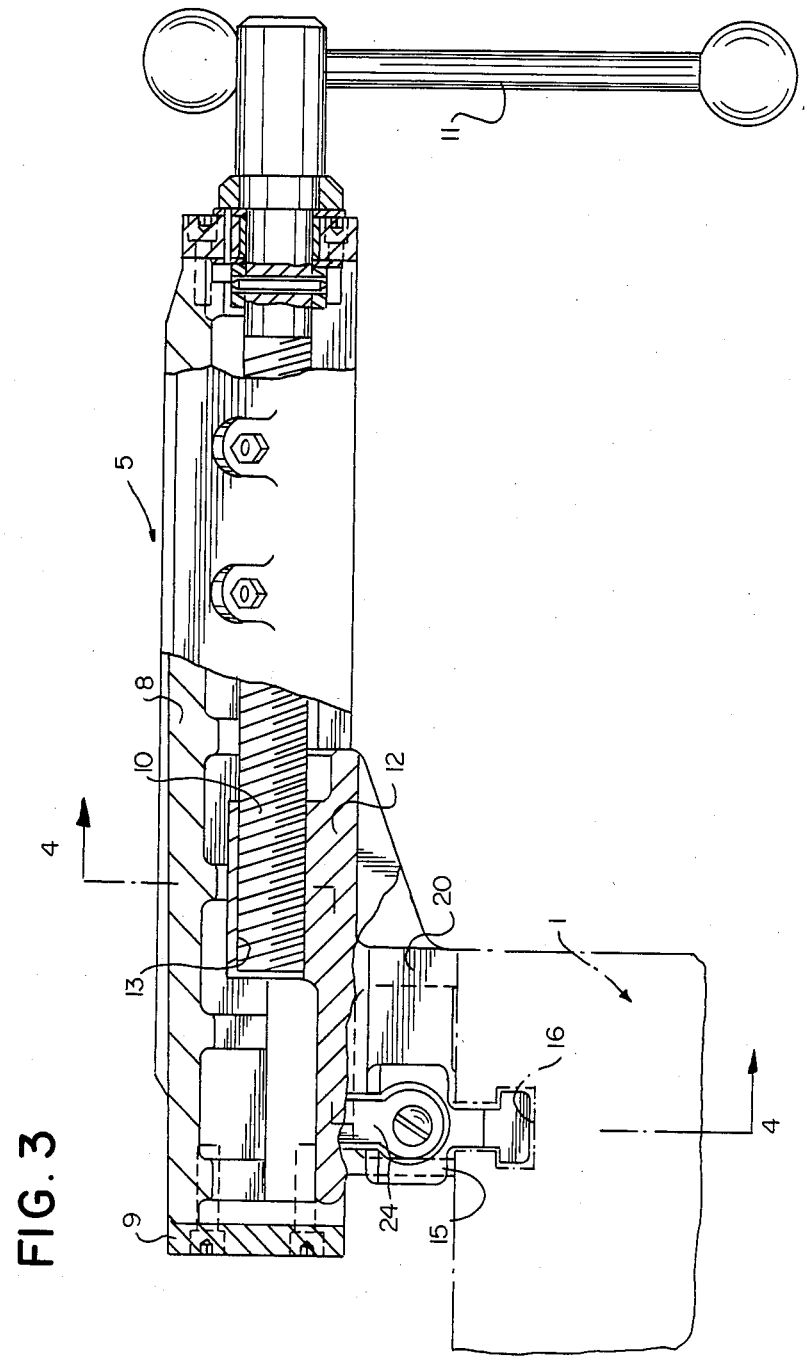
FIG. 3 is a partial sectional view of the clamping means in the direction of arrow A in FIG. 2
Figure 4:
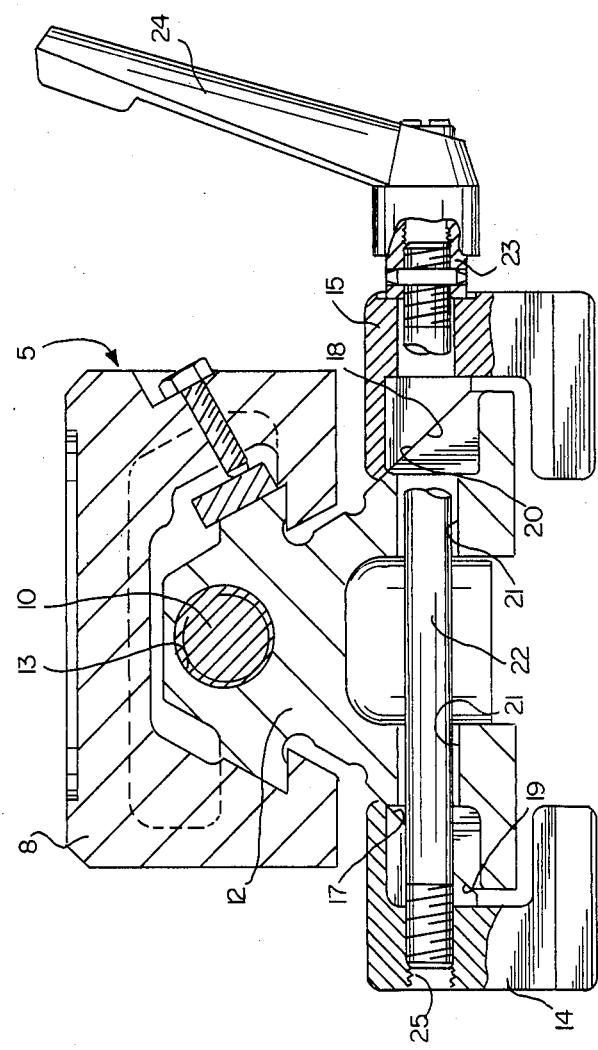
FIG. 4 is a sectional view along line 4—4 in FIG. 3.

The clamping arm 8 is mounted in the known manner on a clamping block 12 for sliding displacement parallel to the axis of the screw spindle 10, as best seen in FIGS. 2 and 4. The end of the screw spindle 10 remote from the actuating arm 11 engages in an internal thread 13 of the clamping block 12. When the screw spindle 10 is rotated, the clamping arm 8 is displaced relative to the stationary clamping block 12 in order, in this way, to clamp the workpiece 6 against a part of the machine frame 1 located opposite the fence plate 9.

Two movable sliding members 14, 15 are associated with the clamping block 12 and protrude into a shaped groove 16 i the machine frame 11. This groove is designed to be complementary in shape to the cross-sectional profile of these sliding members 14, 15. The sliding members 14 and 15 and the shaped groove 16 may, as illustrated, be T-shaped but can also be provided with the customary dove-tailed shape or a different cross-sectional profile.

As shown in particular in FIGS. 2 and 4, each sliding member 14, 15 has a first inclined face 17 and 18, respectively. These inclined faces face one another, extend transversely to the shaped groove 16 and are inclined at an angle of, for example, 45° relative to the horizontal. These first inclined faces 17, 18 of the sliding members 14, 15 are supported on corresponding second inclined faces 19, 20 of the clamping block 12 so as to be slidingly displaceable. The clamping block 12 has a relatively wide bore 21 which extends transversely to the longitudinal axis of the screw spindle 10 and is freely penetrated by an additional screw spindle 22 such that the spindle 22 (in FIG. 4) can move back and forth a predetermined distance (in the plane of drawing). The screw spindle 22 has an attachment 23 screwed on and keyed thereto, with which it abuts against the free end face of the sliding member 15 such that the spindle 22 is supported on this sliding member 15 so as to be rotatable but not axially displaceable (to the left in FIG. 4). The screw spindle 22 may be rotated with the aid of a clamping lever 24 rigidly connected with the screw spindle 22. The end of the screw spindle 22 remote from the clamping lever 24 engages in an internal thread 25 in the sliding member 14.

When the screw spindle 22 is rotated by turning the clamping lever 24, the free end of this spindle is screwed into the internal thread 25 of the sliding member 14 such that this is hereby moved closer to the sliding member 15. Since both sliding members are supported on the inclined faces of the clamping block 12 via their own inclined faces 17, 18 and the screw spindle 22 has sufficient radial clearance within the bore 22, the sliding members 14, 15 can slide up and down the faces 19, 20 according to the direction of rotation of the spindle 22. When the sliding embers 14, 15 slide upwards they are secured in place in the shaped groove 16 due to their corresponding T-shaped profile and thereby clamp the entire clamping means 5 firmly in the machine frame 1 via the clamping block 12. When the screw spindle 22 is rotated in the opposite direction the two sliding members 14, 15 move away from one another and slide down the inclined faces 19, 20. This releases clamping of the clamping means which can then be displaced in the shaped groove 16, repositioned and again clamped in position.

In this way, the two sliding members 14, 15 cause the clamping means 5 to be clamped in the shaped groove 16 at two places which are relatively far removed from one another. Clamping is more exact and can be carried out with greater force than in known arrangements, in which only one clamping slide member is provided approximately in the center of the clamping block 12 (FIG. 4) which is also displaced by an eccentric and not by means of inclined faces. The inclination of the faces 17, 18 and 19, 20 can be adjusted such that the force exerted during clamping is considerable and adjustments can be made to a fine degree.

As illustrated and described, the screw spindle 22 extends parallel to the shaped groove 16 and therefore transversely to the screw spindle 10. The clamping lever 24 is arranged in the region of an end surface of the sliding member 15 extending transversely to the groove 16, i.e. laterally on the clamping block 12. The corresponding end face of the sliding member 14 on the opposite side of the clamping block 12 is free so that additional parts, for example a second clamping arm, may be mounted on it.

What is claimed is:

1. A cutting machine comprising:
   a frame supporting a cutting tool;
   a surface supported by said frame, said surface defining a shaped groove having downwardly facing surfaces;
   a workpiece support mounted on said surface;
   a pair of sliding members in spaced relation to one another having a first pair of inclined faces positioned over and extending transversely to said groove, each of said faces facing the other, said sliding members slidably mounted in and interfitting with said shaped groove and adjustably positioned so that said first pair of inclined faces correspondingly abut a second pair of inclined faces;
   workpiece clamping means having a lower support portion, said lower support portion having a bore and said second pair of inclined faces, said second pair of inclined faces having one face being parallel to one face of the first pair of inclined faces and the other face being parallel to the other face of the first pair of inclined faces and being adjustably clamped by said first pair of inclined faces against the downwardly facing surfaces thereby restricting the movement of said clamping means to a path parallel to said shaped groove; and
   means for locking the clamping means lower support portion in a desired fixed position along the length of said groove comprising a rotatable shaft having its longitudinal axis extending over and in substantially parallel relation with said groove, said rotatable shaft freely penetrating through said bore of said clamping means lower support portion and through said sliding members with one end of said rotatable shaft engaged in an internal thread of one sliding member so that when said rotatable shaft is rotated, the distance between said sliding members is altered, causing said sliding members to slide with their said first pair of inclined faces up said second pair of inclined faces of said clamping means lower support portion, thereby clamping said clamping means in place against the downwardly facing surfaces, when said distance between said sliding members is decreased, and to slide down said second pair of inclined faces of said clamping means lower support portion, thereby freeing said clamping means from the downwardly facing surfaces, when said distance between said sliding members is increased.

2. The cutting machine as set forth in claim 1 wherein said cutting tool is a circular saw.

3. The cutting machine as set forth in claim 1 wherein said shaped groove is inverted "T"-shaped.

4. The cutting machine as set forth in claim 1 wherein said shaped groove is dovetail shaped.

5. The cutting machine as set forth in claim 1 wherein said shaped groove and said sliding members have cross sections such that movement of said sliding members through said shaped groove is only possible along said shaped groove's longitudinal axis, there being no movement of said sliding members allowed rotationally.

* * * * *